Feb. 4, 1969
H. KLETSCHKE ET AL  3,425,640
APPARATUS FOR THE CONTINUOUS TRANSPORTATION
OF PULVERULENT OR FIBROUS MATERIAL
Filed Nov. 24, 1964
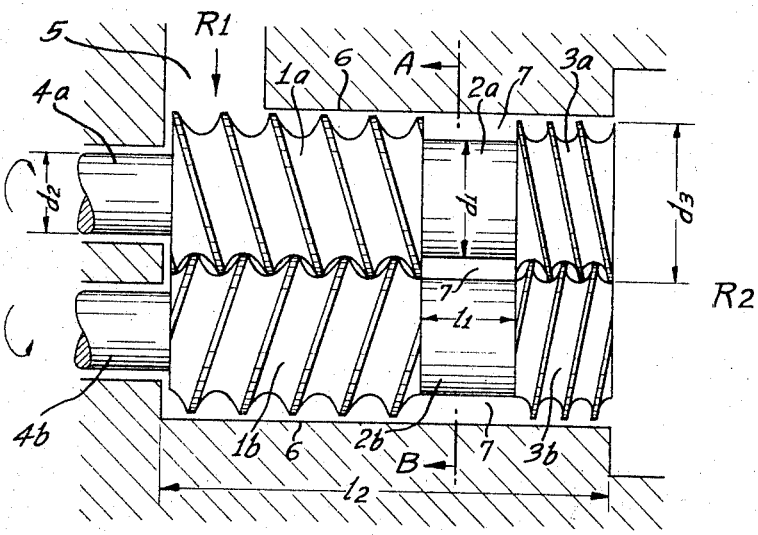
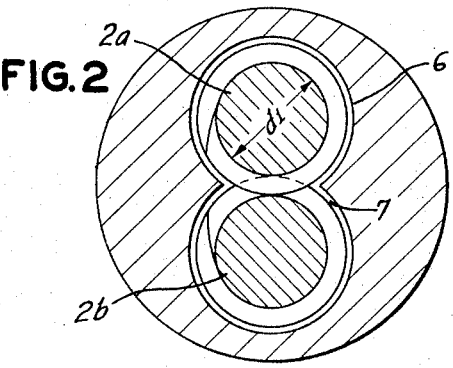
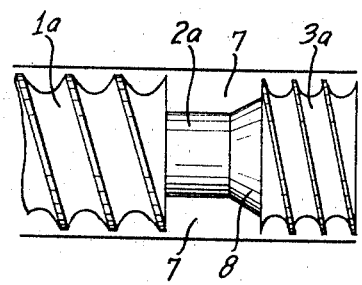
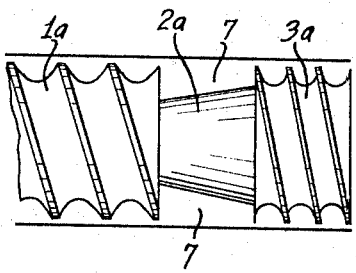
INVENTORS
Hans Kletschke
Hans Macholdt
James E. Bryan
ATTORNEY United States Patent Office 3,425,640
Patented Feb. 4, 1969

3,425,640
APPARATUS FOR THE CONTINUOUS TRANSPORTATION OF PERVERULENT OR FIBROUS MATERIAL
Hans Kletschke and Hans Macholdt, Wiesbaden-Biebrich, Germany, assignors to Kalle Aktiengesellschaft, Wiesbaden-Biebrich, Germany, a corporation of Germany
Filed Nov. 24, 1964, Ser. No. 413,476
Claims priority, application Germany, Nov. 27, 1963, K 51,471
U.S. Cl. 241—236    7 Claims
Int. Cl. B02c 1/08, 7/04, 13/20

This invention relates to a process and apparatus for the continuous transportation of pulverulent or fibrous material between regions in which different pressures exist.

It is known that material containing cellulose can be transferred continuously, from a region in which atmospheric pressure exists to a region in which a pressure different from atmospheric pressure exists, by means of screw or worm conveyers. In this process, the material forms hard lumps at the end of the form conveyer and these lumps have to be comminuted. The lumps can be comminuted at the rate at which they are formed by continuous grinding, tearing or cutting, by means of suitable devices. In such processes, however, the material frequently becomes tightly knotted or it acquires some other compact form, which renders it incapable of being homogenized to a degree sufficient to permit further processing.

In one know process, comminution of the hard lumps takes place at specific intervals immediately and in one operation. In this case, comminution is effected by means of a non-rotating ram or by means of water, which may be in the form of steam, which is ejected from outlets in an extension of the hollow shaft of the worm conveyer to impinge on the hard lumps. However, this system cannot be used when the material is to be transported into a region in which the pressure is considerably higher than atmospheric pressure because the worm conveyer is only a single-thread worm and there is no guide for the plug of material formed. Furthermore, complex apparatus is required to power the ram and such apparatus is susceptible to trouble.

The present invention provides a process for the continuous transportation of pulverulent or fibrous material between two regions in which different pressures exist, wherein the material is caused to progress through part of the path between the regions in the form of a pressure-tight mass of cylindrical external periphery and through other parts of the path, bonding the aforesaid part, in helical form.

The invention also provides an apparatus for use in the above process, comprising in a bounding chamber a screw or worm conveyer having on the same shaft at least two screw or worm portions separated by a smooth portion of a diameter less than the peripheral diameters of the screw or worm portions.

Thus, referring to FIGURE 1 of the accompanying drawings to be described in more detail below, the material is conveyed from a region $R_1$, in which a pressure $p_1$ exists, through three conveying zones into a region $R_2$ in which a pressure $p_2 \neq p_1$ exists, the material being helical in form during transportation through the first and third conveying zones and in the form of a pressure-tight, hollow cylindrical plug during passage through the second conveying zone.

The pressure in region $R_2$, to which the material is transported from region $R_1$, may be higher or lower than the pressure in region $R_1$, and thus the pressure difference $p_2-p_1=\Delta p$ may be positive or negative. Preferably, atmospheric pressure exists in one of the regions $R_1$ and $R_2$. If atmospheric pressure exists in region $R_1$, it generally means that the material is being conveyed from a working room into a vessel $R_2$ in which superatmospheric pressure or subatmospheric pressure exists. If atmospheric pressure exists in region $R_2$, it generally means that the material is being discharged from a vessel $R_1$ in which superatmospheric pressure or subatmospheric pressure exists into a working room $R_2$. The process is thus suitable for both charging and discharging vessels in which the pressure is different from atmospheric pressure. It is also possible to transfer material from a region $R_1$ to a region $R_2$ in which the pressures $p_1$ and $p_2$ are above or below atmospheric pressure, and it is also possible for one of the pressures indicated to be in excess of atmospheric pressure and the other below atmospheric pressure.

The pressure difference $p_2-p_1=\Delta p$ may be considerable, for example, up to several hundred atmospheres. The upper limit is set only by the mechanical strength of the apparatus defining the conveyer zones and the material to be transported.

The route followed by the material in the process of the invention is as follows: It is fed from region $R_1$ into conveying zone 1 in which it is transported in a forward direction by devices of known design, generally one or more worm conveyers having any desired thread profile and rotating in either direction. It then enters conveying zone 2 which is formed by non-flighted core sections of the worm conveyers and the inside wall of the housing that surrounds the non-flighted sections; these sections thus permit the material to be transported forward essentially in a straight line in the form of a compressed plug. The shape of the plug is determined by the geometric dimensions of conveying zone 2. Since the non-flighted sections are circular in transverse section and since the inside wall of the housing is also circular in transverse section in most cases, zone 2 and the plug of material forced through the zone 2 are, for example, similar to a figure 8 in transverse section when a pair of worm conveyers is used (cf. FIG. 2 of the accompanying drawings, also to be referred to below). The material is forced along the walls of zone 2, where it is highly compressed, as the result of the frictional force exerted by the wall, and then forced against the conveyer units of zone 3 by the transporting action of the conveyer units in zone 1, which action compresses the material to an even greater extent. The material is then moved by the conveyer units of zone 3, which are similar to those of zone 1 and are thus worm conveyers in most cases, and transported into region $R_2$. In this phase of the transportation process, the conveyer units of zone 3 not only transport the material but also comminute the compact plug leaving zone 2.

The highly compressed material which has passed through zone 2 forms a seal between the two regions of different pressure (pressure difference $p_2-p_1=\Delta p$), which seal functions even when the conveyer worms are not in motion. The material is homogenized to a considerable degree by the high degree of compression produced in zone 2, which is especially desirable as regards the further chemical reaction of high-molecular weight non-crystalline substances and microcrystalline substances. In order to achieve even greater compression of the material in zone 2, it is preferred in some cases, for example in the case of products difficult to compress and/or in the case of great pressure difference $\Delta p$, to provide for a long zone 2 as compared with the major diameters of the worm conveyers in zones 1 and 3 and/or to incorporate elements that narrow zone 2 in the direction in which the material is transported.

The process is especially suitable for feeding-in or discharging moist or dry pulverulent or fibrous macromolecular and/or microcrystalline substances that can be compressed into compact, pressure-resistant plugs, for example, pulp and cellulose and the derivatives thereof such as cellulose ether, cellulose xanthate, alkali cellulose and vegetable gums and the derivatives thereof. These substances can be continuously fed into vessels in which superatmospheric or subatmospheric pressures exist, for example, for the purpose of digestion, preparation or reaction, or they can be continuously discharged from such vessels.

In the apparatus of the invention for the continuous transportation of pulverulent or fibrous material between two regions in which different pressures exist by means of at least one worm conveyor disposed in a chamber, the core of the worm conveyor or conveyors is devoid of thread over a certain distance of its length and forms a smooth-surfaced shaft (which may be cylindrical, but see also below) whose diameter is less than the major diameter of the worm conveyor. When more than one worm conveyor is used, the surface areas forming the rear and forward ends of the non-flighted section of one conveyor are in the same plane as the surfaces forming the rear and forward ends of the other conveyor or conveyors, and the thread of one worm engages the thread of at least one other worm, a space being formed between the non-flighted sections and the surrounding interior wall of the chamber, through which space the material is forced.

In the simplest embodiment of a device pursuant to the invention, a single conveyor worm is disposed in a chamber having a circular interior wall. This means that an annular space is formed in the region of the smooth shaft section, through which space the material passes. However, it is also possible to combine two, three, four or more worms of the same major diameter in one unit. For example, four worms may be disposed side by side or in pairs one above the other, although, in principle, a range of possible arrangements between these two may be used. Preferably, two worm conveyors or identical design are used. These two conveyors, in conjunction with the inside wall of the chamber, form a space that is similar to a figure 8 in transverse section.

A preferred form of construction of an apparatus according to the invention, in which a pair of worm conveyors is used, is illustrated in the accompanying drawings in which:

FIGURE 1 is an elevation of a conveying device with the confining chamber shown in section, FIGURE 2 is a section on the A–B of FIGURE 1, FIGURE 3 is an elevation of a single shaft conveyor whose non-flighted section is provided at one end with a conical ring, and FIGURE 4 is a similar view of a single shaft conveyor whose non-flighted section is conical in shape, the base of the cone being towards the discharge end of the apparatus.

In the apparatus shown in FIGURE 1, the material to be transported is passed from a region $R_1$ through an inlet 5, for example, a hopper, into the conveying device. In this device, worm conveyers 1a and 1b and 3a and 3b are rigidly mounted on the shafts 4a and 4b. The worm conveyers may be welded onto the shafts, or the shaft and conveyer may be manufactured from a single piece of material. The shafts, and thus also the worm conveyers, are disposed one above the other and are counter-rotated by a drive, not shown in FIGURE 1. They may also be rotated in the same direction and/or be disposed horizontally alongside or obliquely with respect to one another. The non-flighted section 2a is disposed between the conveyor worms 1a and 3a, and the non-flighted section 2a is disposed between the conveyer worms 1b and 3b. The parts 4a, 1a, 2a and 3a are disposed longitudinally in symmetry with the parts 4b, 1b, 2b and 3b respectively, and all the parts are enclosed in a housing which is circular in transverse section. The core sections 2a and 2b have a smooth surface and are circular in transverse section. Their diameter $d_1$ may be identical with or different from the diameters $d_2$ of the drive shafts 4a and 4b, but it is preferable that they be greater than the diameters $d_2$, as shown in FIGURE 1. The core diameters $d_1$ are always smaller than the major diameters $d_3$ of the worm conveyers. The length $l_1$ of the non-flighted sections 2a and 2b is generally 0.5 to 5, but preferably 1.5 to 2.5, times that of the major diameter of the conveyer worms 1a, 1b, 3a, 3b. A space 7 is left between the non-flighted sections 2a and 2b and the circular wall 6 of the chamber. FIGURE 2 shows that this space has a transverse section similar to a figure 8.

The worm conveyers may have any desired thread profile. However, in order that the worm conveyers 3a and 3b may comminute the compressed material leaving the space 7 as well as transport it, it is advantageous for them to have a greater volume of screw threads and a more pointed thread profile than the worm conveyers 1a and 1b. For the same reason it is preferable that the worm conveyers 3a and 3b have a greater number of threads than the worms 1a and 1b.

In order to narrow the space 7 in the direction in which the material is transported, which is frequently desirable, choke rings of any desired shape may be mounted concentrically on the non-flighted sections 2a and 2b at the ends adjacent the worms 3a and 3b. FIGURE 3 shows a single worm whose non-flighted section 2a is provided with a conical choke ring 8. A choke ring having a rounded profile or an angular profile may also be used. The addition of a choke ring thus narrows the space 7 in the direction in which the material is transported, which results in the material being compressed to a very high degree. The same effect is achieved with the type of worm shown in FIGURE 4. Its non-flighted section 2a is frusto-conical in shape with the base of the cone at the forward end, with reference to the direction in which the material is transported.

The foregoing details relating to the design of the single shaft of a pair of conveyers also apply to a conveyed device in which only one conveyer shaft is used or for a device in which a greater number of conveyer shafts is used.

It will be obvious to those skilled in the art that many modifications may be made within the scope of the present invention without departing from the spirit thereof, and the invention includes all such modifications.

What is claimed is:

1. Apparatus for conveying a mass of material between two regions of different pressure which comprises a housing having a chamber therein, a pair of rotatable shafts with interfolded screw threads thereon, the threads of each shaft being interrupted to form adjacent smooth portions having diameters less than the peripheral diameters of the threaded portions and lengths in the range of about 0.5 to 5 times the said peripheral diameters, the wall of said chamber being solid and imperforate throughout the length thereof and disposed immediately radially outwardly of and adjacent the outer periphery of said threads and defining a space with said smooth portions, whereby highly compressed material disposed in said space forms a seal between the two regions of different pressure even when said shafts are not in motion.

2. An apparatus according to claim 1 in which the shafts and the smooth portions have substantially the same diameter.

3. An apparatus according to claim 1 in which, with reference to the conveying direction, the forward ends of the smooth portions are of greater diameter than the rear ends.

4. An apparatus according to claim 1 in which the smooth portions have a frusto-conical shape.

5. An apparatus according to claim 1 in which a transverse section through the housing has the shape of a figure eight where the housing encloses the smooth portions.

6. An apparatus according to claim 1 in which, with reference to the conveying direction, the forward parts of the threaded portions have less pitch than the rear parts.

7. An apparatus according to claim 1 in which, with reference to the conveying direction, the forward parts of the smooth portions have a diameter intermediate that of the remainder of the smooth portions and the periphery of the threaded portions.

References Cited

UNITED STATES PATENTS

| | | | |
|---|---|---|---|
| 2,151,253 | 3/1939 | Whitney | 214—152 |
| 2,314,706 | 3/1943 | Johnston | 241—274 |
| 2,538,465 | 1/1951 | Marco | 241—276 |
| 2,671,617 | 3/1954 | Talge | 241—274 |
| 2,884,145 | 4/1959 | Muller | 214—17.4 |
| 2,926,802 | 3/1960 | Stuewer | 214—152 |
| 2,975,096 | 3/1961 | Ginaven | 162—18 |
| 3,070,005 | 12/1962 | Kemp | 100—146 |

FOREIGN PATENTS 116,441  3/1959  U.S.S.R.

ROBERT C. RIORDAN, *Primary Examiner.*

DONALD G. KELLY, *Assistant Examiner.*

U.S. Cl. X.R.

222—413; 214—17; 302—50